United States Patent [19]

Oonaka et al.

[11] Patent Number: 4,596,225
[45] Date of Patent: Jun. 24, 1986

[54] INTERNAL COMBUSTION ENGINE PROVIDED WITH MECHANICAL SUPERCHARGER

[75] Inventors: Hidemi Oonaka; Toyokazu Baika; Yoshiaki Shibata; Kingo Horii, all of Susono; Yasushi Sato, Mishima, all of Japan

[73] Assignee: Toyota Jidosha Kabushiki Kaisha, Japan

[21] Appl. No.: 751,383

[22] Filed: Jul. 3, 1985

[30] Foreign Application Priority Data

Jul. 6, 1984 [JP] Japan .............................. 59-138997

[51] Int. Cl.⁴ ............................................ F02D 23/00
[52] U.S. Cl. ..................................... 123/559; 123/564
[58] Field of Search ................................ 123/559, 564

[56] References Cited

U.S. PATENT DOCUMENTS 4,485,793  12/1984  Oguma ................................. 123/559

FOREIGN PATENT DOCUMENTS 56-167817  12/1981  Japan .
97042     6/1982  Japan ................................. 123/559

Primary Examiner—Douglas Hart
Attorney, Agent, or Firm—Parkhurst & Oliff

[57] ABSTRACT

A by-pass control system for an internal combustion engine provided with a mechanical supercharger arranged in an intake pipe of the engine. The supercharger is connected to a crankshaft by means of a clutch operated in accordance with the engine load as well as the engine speed. A system is provided for maintaining the clutch disengaged irrespective of the engine load and engine speed when the engine is cranking. The load applied to a starter is decreased during the cranking operating due to the positive disconnection of the supercharger from the crankshaft, so that the engine can be easily started.

9 Claims, 7 Drawing Figures

INTERNAL COMBUSTION ENGINE PROVIDED WITH MECHANICAL SUPERCHARGER

BACKGROUND OF THE INVENTION

1. Field of the Invention

The present invention relates to a device for controlling a mechanical super charger in an internal combustion engine.

2. Description of the Related Art

Known in the related art, e.g., Japanese Unexamined Patent Publication (Kokai) No. 56-167817, is an internal combustion engine provided with an electromagnetic clutch between the supercharger and the engine crankshaft for controlling the supercharger. The clutch is selectively engaged or disengaged in accordance with the engine condition for the optional supercharging operation. For the highest fuel consumption efficiency, the clutch should be engaged at as high an engine speed as possible. However, too high an engine speed causes a shock upon clutch engagement and damage to the frictional surfaces of the clutch. Therefore, the engine speed for clutch engagement is kept low enough to balance the requirements of fuel consumption efficiency with the prevention of shock and clutch damage. In addition to the control based on the engine speed, the clutch is also controlled by the ratio of intake air amount to the engine speed. That is, the clutch is engaged when the ratio is large and is released when the ratio is small. In engine starting the engine the ratio can exceed the clutch engagement level irrespective of very low engine speed during the cranking, thus connecting the engine to the supercharger. This means the starter has to bear both the load for cranking the engine and the load for rotating the supercharger. As a result, it becomes difficult to start the engine.

SUMMARY OF THE INVENTION

An object of the present invention is to provide a device for operating a supercharger capable of decreasing the load borne by the starter during the engine cranking condition.

According to the present invention there is provided an internal combustion engine including an engine body; an intake system connected to the engine body for controlling the amount of air introduced into the engine body; an exhaust system connected to the engine body for reception of combustion products from the engine body; a supercharger as a mechanical pump arranged in the intake system; clutch means for selectively connecting kinematically the engine with the supercharger; operating means, for operating the clutch means, responsive to at least the engine operating conditions related to engine load; means for detecting the starting condition of the engine; and means, connected to the detecting means, for cancelling the operation of the operating means for maintaining the clutch means to be released during the engine starting condition.

DESCRIPTION OF THE PREFERRED EMBODIMENTS

Figure 1:
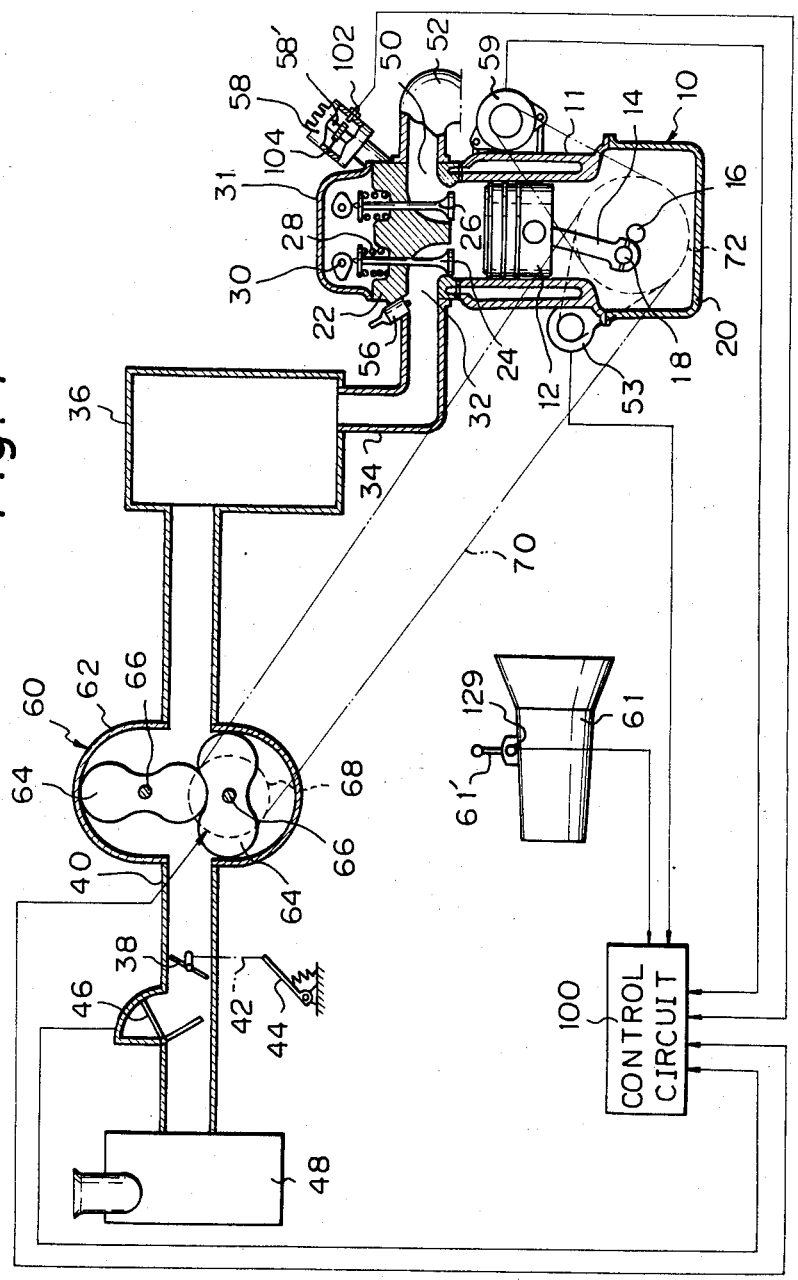
FIG. 1 is a general view of an internal combustion engine according to a first embodiment of the present invention.

In FIG. 1, reference numeral 1 denotes an engine body, 11 a cylinder block, 12 a piston, 14 a connecting rod, 16 a crankshaft, 20 an oil pan, 22 a cylinder head, 24 an intake valve, 26 an exhaust valve, 28 valve springs, 30 camshafts, and 31 a camshaft housing.

The cylinder head 22 has an intake port 32 which is connected to a surge tank 36 by way of an intake pipe 34. A throttle valve 38 is arranged in an intake pipe. The throttle valve 38 is connected to an accelerator pedal 44 by means of a link 42. An air flow meter 46 is arranged upstream from the throttle valve 38. An air cleaner 48 is arranged upstream of the air flow meter 46.

The cylinder head 22 has an exhaust port 50 which is connected to a catalytic converter 54 via an exhaust manifold 52.

In this embodiment, the internal combustion engine is a fuel injection type provided with a fuel injector 56 arranged in the intake pipe 34. Reference numeral 58 denotes a distributor for supplying high voltage from an ignition coil (not shown) to a spark plug (not shown) arranged in the combustion chamber.

Reference numeral 53 is a starter, 59 alternator, and 61 a transmission device. The starter 53 and the alternator 59 are connected to the crankshaft 16 by means of pulleys and belts.

According to the present invention, a Roots blower 60 is arranged in the intake pipe 40 downstream from the throttle valve 38 as a mechanical supercharger. The Roots blower 60 has a housing 62, and a pair of rotors 64 of a cocoon shape arranged in the housing 62. The rotors 64 have shafts 66 having wheels (not shown) meshing with each other, so that the rotors 64 rotate oppositely in the housing 62 while a small clearance is maintained between the rotors 64 and the inner periphery of the housing 62, whereby fluid is sucked from an inlet 62a and is forced out of an outlet 62b. One of the rotors 64 has a clutch 68 provided with a pulley 68-5 (FIG. 2) which is connected, via a belt 70, to a pulley 72 on the crankshaft 16, so that the blower 60 is rotated by the rotation of the crankshaft 16.

Figure 2:
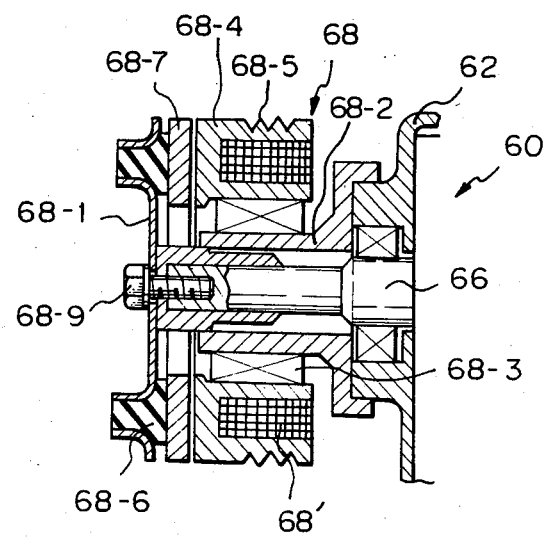
FIG. 2 is a longitudinal cross-sectional view of a clutch device in FIG. 1.

As shown in FIG. 2, the clutch 68 has a circular plate 68-1 connected by means of a bolt 68-9 to an end of the shaft 66 projecting out of the housing 62 of the blower 60. A solenoid holder 68-4 is rotatably arranged, via a bearing unit 68-3, on a sleeve 68-2 which is fixedly connected to the housing 62 of the blower 60. The pulley 68-5 shown also in FIG. 1 is formed on the outer periphery of the solenoid holder 68-4. The belt 70 in FIG. 1 loops around the pulley 68-5. An engaging member 68-7 of a disk shape is connected to the circular plate 68-1 via a plurality of angularly spaced resilient elements 68-6, so that the engaging member 68-7 faces the solenoid holder 68-4 at a small distance. The facing surfaces of these parts 68-7 and 68-4 construct friction engaging surfaces. An annular solenoid 68' is arranged in an annular space formed inside of the solenoid holder 68-4. The solenoid is steadily supported on the sleeve 68-2 by means of a stay member (not shown). The resilient elements 68-6 urge the engaging member 68-7 so that the member 68-7 is detached from the solenoid holder 68-4 when the solenoid 68' is deenergized. In this case, the rotation of the solenoid holder 68-4, which always rotates due to the rotation of the engine, cannot be transmitted to the shaft 66 of the blower 60. Thus, the supercharging does not occur. When the solenoid 68' is energized, the engaging member 68-7 is moved toward the solenoid holder 68-4 against the force of the resilient element 68-6 so that the frictional engaging surfaces of the parts 68-4 and 68-7 are engaged with each other. As a result, rotation of the solenoid holder 68-4, which always rotates due to the rotation of the engine, is transmitted to the shaft 66 of the blower 60.

Figure 3:
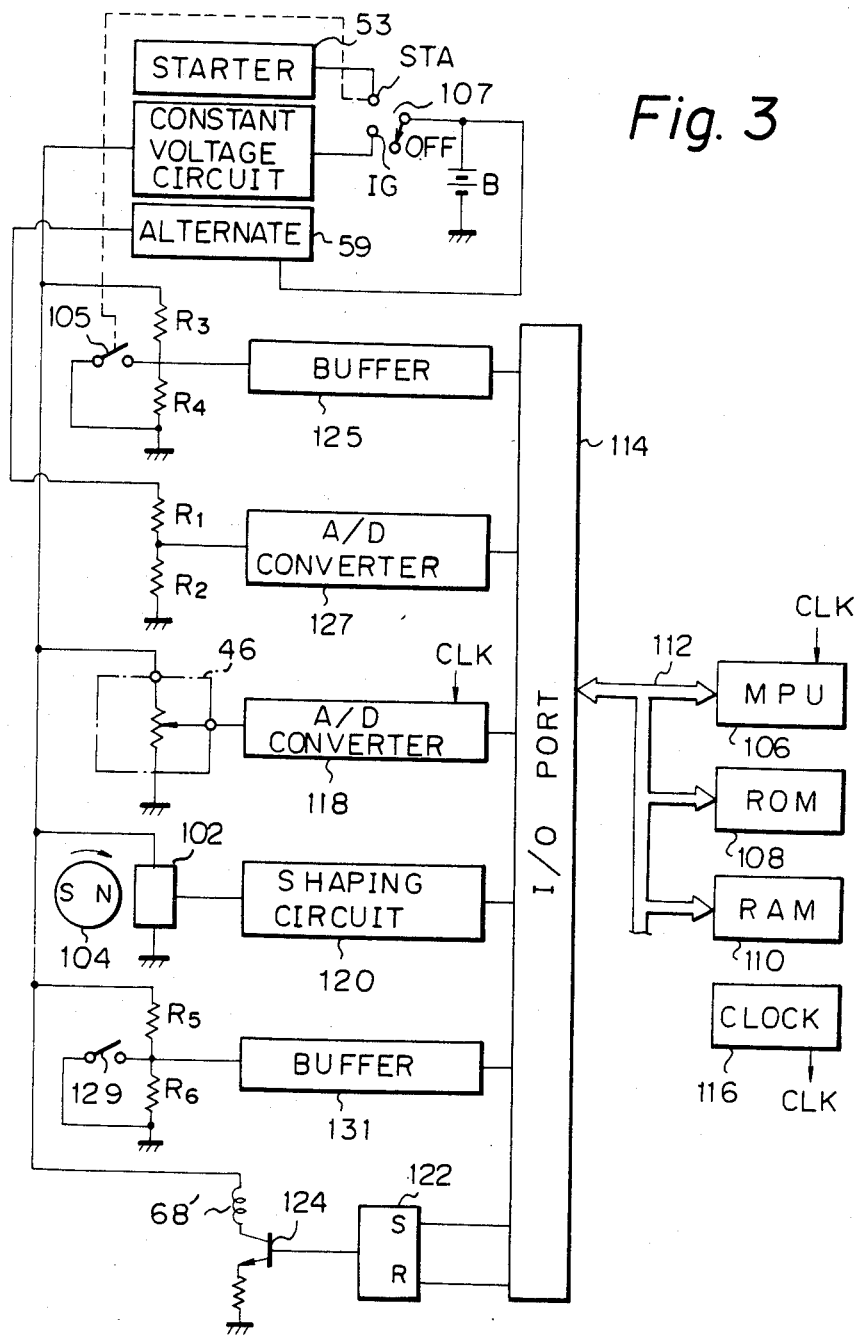
FIG. 3 is a block diagram of the control circuit in FIG. 2.

Reference numeral 100 denotes a control circuit for operating the clutch 68. The control circuit 100 is adapted for issuing, in response to signals from a group of sensors detecting operating conditions of the engine, signals for operating the clutch 68. The control circuit 100 may additionally include means for controlling the air-fuel ratio as well as ignition timing. The control circuit 100 can be constructed just to operate the clutch. The sensor group is provided with the air flow meter 46 and an engine speed sensor 102 arranged on the distributor 58. As shown in FIG. 3, the air flow meter 46 is constructed as a potentiometer 46a connected to a measuring plate 46b capable of rotating in accordance with the amount of the air, so as to provide an analog signal Q indicating the amount of the intake air. The engine speed sensor 102 is constructed as a Hall element facing a magnet piece 104 arranged on a distributor shaft 58' of the distributor 58 connected to the crankshaft 16 so as to provide digital signals N indicating the rotational speed of the engine.

As for sensors for detecting the starting condition, in this first embodiment, a switch 105 for sensing the operation of the starter 53 and a device for detecting a voltage level in the alternator 59 are provided. As shown in FIG. 3, the switch 105 is arranged so that the switch 105 is made ON when an ignition key switch 107 is moved to ST position. The output voltage from the alternator 59 is detected by the divider resistors R3 and R4.

The control circuit 100 has the construction as shown in FIG. 3. The control circuit 100 is formed as a microcomputer system, having a microprocessing unit (MPU) 106, a read-only memory (ROM) 108, a random-access memory (RAM) 110, a bus 112 connecting these parts with each other, and a clock pulse generator 116. The air flow meter 46 is connected to an input-output (I/O) port 114 via an analog to digital (A-D) converter 118. The engine speed sensor 102 is connected to the I/O port 114 via a shaping circuit 120. Furthermore, the I/O port 114 is connected to a latch 122 which is connected to a base of a transistor 124. The solenoid 68' of the clutch 68 is located in a collector-emitter circuit of the transistor 124. The dividing point of the divider resistances R3 and R4 is connected to the I/O port 114 via a buffer 125 and also connected to the ground via the switch 105 for detecting the ST position of the ignition key switch 107. The alternator 59 is connected to divider resistances R1 and R2. The dividing point is connected, via digital-to-analog (D/A) converter 127, to the I/O port 114.

When the control circuit 100 is also intended for controlling various engine operations, such as the air-fuel ratio and ignition timing, in addition to clutch control, various sensors as well as actuators are connected to the I/O port 114. These, however, are not shown in the drawing since they are not directly related to this invention.

The ROM 108 is provided with programs for operating the clutch 68 in accordance with the present invention as well as for operating other engine states. The programs, which are directly related to the present invention, will be described with reference to the attached drawings.

Figure 4:
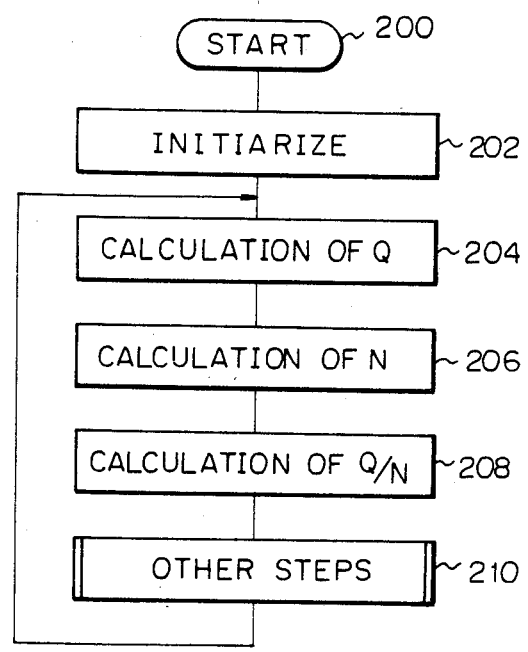
FIGS. 4 and 5 are flow charts illustrating the operation of the present invention.

FIG. 4 is a flow chart of a main routine, wherein various steps are executed, required to be quickly treated. At point 200, the program is started. At point 202, registers in the MPU 106, RAM 110, and I/O port 114 are initialized. At point 204, an intake air amount Q is calculated by the signal from the air flow meter 46, which amount is transformed into a digital signal. The calculated data of the intake air amount is stored in a predetermined area of the RAM 110. At point 206, the engine speed N is calculated from the pulse signals from the engine speed sensor 102. The calculated data related to the engine speed N is stored in a predetermined area of the RAM 110. At point 208, a ratio Q/N of the amount of intake air to the engine speed is calculated and the corresponding data stored in the predetermined area of the RAM 110. The ratio Q/N indicates the engine load, as well known to those skilled in this art. The point 210 indicates generally various other steps to be executed in the main routine.

Figure 5:
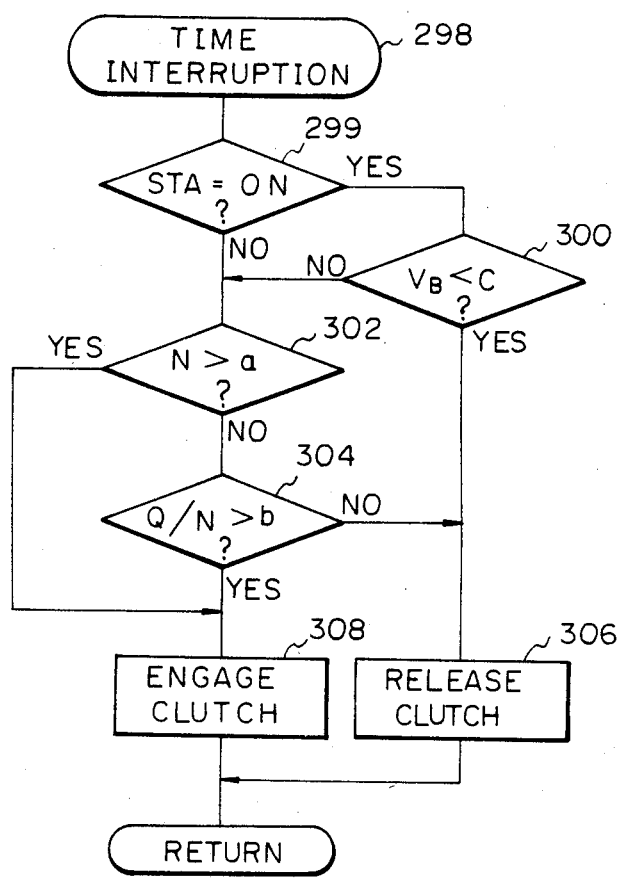

FIG. 5 indicates a routine for operating the clutch 68. This routine is a time interruption routine effected at a predetermined time interval, such as 35 msec. An interruption requirement signal is input to an interruption port of the MPU 106 at predetermined periods to execute the routine at point 298. At the following point 299, it is judged whether the switch 105 is made ON by looking for the content of memory area for storing the data about the condition of the switch 105. This judgement is effected by detecting the level of the I/O port connected to the switch 105. When the switch 105 is made OFF, the port becomes high level. When the switch 105 is made ON, the port 114 will become low level. After the engine has started, the starter switch 105 is made ON so that the program flows, from the point 299 to a point 302. When the starter switch 105 is made OFF during the starting, the program proceeds to a point 300, where it is judged whether the voltage $V_B$ detected by the divider resistors R1 and R2 is larger than a predetermined value c, for example 10 V. This value c is determined so that it is larger than a value of the voltage of the alternator 59, obtained during the operation of the starter 53 and lower than a value of the voltage of the alternator 59 during the usual operation of the engine wherein the starter 53 is stopped. When the voltage level in the alternator, $V_B$, is larger than the predetermined value c, this means that the engine has already operated even if the starter switch 105 is made ON, so that the program also goes to the point 302, where it is judged whether the engine speed N is higher than a predetermined value a, and, at a point 304, it is judged whether the ratio Q/N is larger than a predetermined value b. As shown by an operational diagram in FIG. 6, when the engine speed N is lower than a predetermined level a ("No" at the point 302) and when the ratio Q/N is smaller than a predetermined level b ("No" at the point 304), the engine is under a condition where the supercharger 60 should not be operated.

In this case, the program proceeds to a point 306, where a high level signal is applied to the reset terminal of the latch 122 from the I/O port 114. As a result, a low level signal appears at the output of the latch 122, causing the transistor 124 to go OFF. As a result, the solenoid 68' is de-energized, causing the clutch 68 to be disconnected, so that no positive transmission of the rotation of the engine to the supercharger 60 takes place. Only free rotation of the rotors 64 takes place due to the flow of air directed from the throttle valve 38 to the surge tank 36, and therefore no supercharging takes place.

Figure 6:
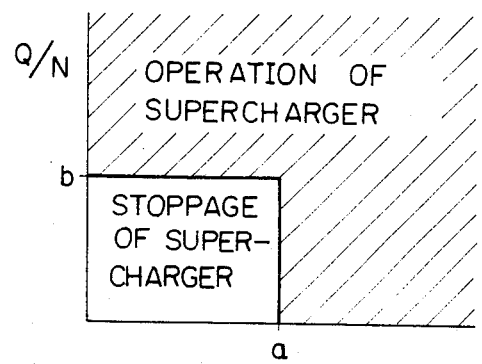
FIG. 6 is a diagram indicating how the supercharter is operated.

When the engine speed N is larger than the predetermined value a ("Yes" at the point 302) or when the ratio Q/N is larger than the predetermined value b ("Yes" at the point 304), the engine is under a state where the supercharger 60 should be operated, as shown by the shaded area in FIG. 6. In this case, the program proceeds to a point 308, where a high level signal is applied to the set terminal of the latch 122, causing a high level signal to appear at the output of the latch 122. As a result, the transistor 124 is made ON, so that the solenoid 68' is energized, causing the clutch 68 to be engaged. Therefore, the rotation of the crankshaft 16 is transmitted via the pulley 72, the belt 70, pulley 68-5 (FIG. 2), solenoid holder 68-4, and engaging member 68-7 to the shaft 66 of the rotors 64. Thus, the rotors 64 are rotated oppositely, causing air from the throttle valve 38 to be sucked into the supercharger 60. The air from the supercharger 60 is forced via the surge tank 36, intake pipe 34, and the intake port 32 into the engine combustion chamber. The predetermined value a of the engine speed and the predetermined value b of the ratio Q/N, which determine whether the supercharger 60 is operated or not, should be determined by considering the following. The switching point should be located in as low an engine speed area as possible in order to decrease shock occurring when the clutch is switched from a release condition to an engaged condition as well as in order to prevent the frictional elements of the clutch from being quickly damaged. Contrary to this, the switching point should be located in as high a speed area as possible in order to increase the fuel consumption efficiency. Therefore, the switching point, i.e., the value of a and b, are determined in consideration of coordination between the requirements.

When the engine is starting, the result of the judgement at the point 299 is "yes" and the result of the judgement at the point 300 is also "yes". Thus, the program goes to a point 306 irrespective of the engine speed N as well as the ratio of the intake air amount to the engine speed, Q/N, so that the clutch 68 is released to disconnect the engine from the supercharger. As a result, the load applied to the starter 53 is correspondingly decreased and therefore it is possible to increase the cranking speed, permitting the engine to be easily started.

In this first embodiment, both of the operation of the starter switch as well as the voltage of the alternator are detected. However, it is also possible for just one of them to be detected.

Figure 7:
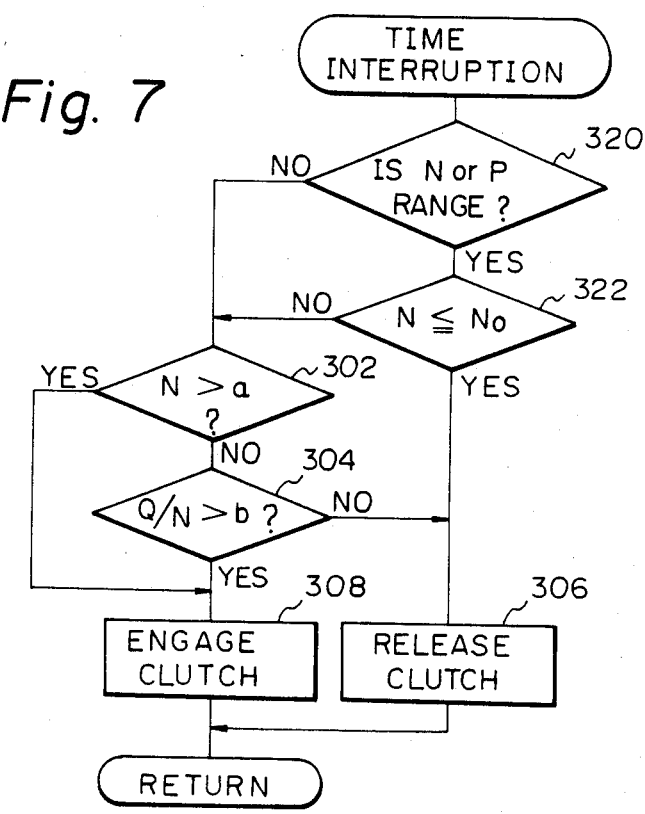
FIG. 7 is a flow chart illustrating the operation in a second embodiment of the present invention.

In a second embodiment, the starting condition is detected by a combination of shift position of the transmission 61 and the engine speed. As shown in FIG. 1, a sensor 129 is provided for detecting a position of a shift lever 61' of the transmission device 61. As shown in FIG. 3, the shift position sensor 129 is constructed as a switch which is made ON when the shift lever 61' is in its neutral position in case where the transmission 61 is a manual operating type. The switch 129 is made ON when the shift lever is in its parking position in case where the transmission 61 is automatic. The switch 129 is made OFF at positions other than the neutral or parking position. The switch 129 is arranged between a dividing point of divider resistors R5 and R6. The dividing point is connected to the I/O port 114 via a buffer 131. The operation of this second embodiment is shown in a flow chart as shown in FIG. 7. At a point 320, it is judged whether the shift lever 61' is in its neutral or parking position. At point 322, it is judged whether the engine speed N is higher than a predetermined value NO which is slightly larger than the engine speed corresponding to the cranking speed. The "yes" results at both points 320 and 322 indicate that the engine is starting, so that the program proceeds to a point 306 where the clutch 68 is released for stop the operation of the supercharger 60. When the engine is in a condition other than starting, the program proceeds to the usual steps below the step 302 for selectively operating the clutch 68 in accordance with engine speed N and the ratio of intake air amount to the engine speed Q/N, which are already explained with reference to FIG. 5.

As another way for sensing the starting, it is possible to detect whether the engine exhaust temperature is lower than a predetermined value. Alternatively, it is possible to detect whether the pressure in the intake line downstream of the throttle valve 38 and upstream of the supercharger 60 is lower than a predetermined value. Furthermore, it is also possible by detecting whether the cranking speed is lower than a predetermined value only. These measures can be suitably combined to detect the starting.

While embodiments of the present invention are described with reference to the attached drawing, many modifications and changes may be made by those skilled in this art without departing from the scope and spirit of the invention.

What is claimed is:

1. An internal combustion engine comprising:
an engine body:
an intake system for controlling the amount of air introduced into the engine body;
an exhaust system connected to the engine body for reception of combustion product from the engine body;
a supercharger as a mechanical pump arranged in the intake system;
clutch means for selectively connecting kinematically the engine with the supercharger;
operating means, responsive to engine operating conditions related at least to the engine load, for operating the clutch means;
means for detecting the starting condition of the engine; and
means, connected to the detecting means, for cancelling the operation of the operating means for maintaining the clutch means disengaged during the starting condition of the engine.

2. An internal combustion engine according to claim 1, wherein said operating means comprises detector means for detecting an engine parameter, related at least to the engine load, and actuating means, responsive to signals from the detector means, for providing signals directed to the clutch device.

3. An internal combustion engine according to claim 2, wherein said detector means comprises a first sensor means for detecting the ratio of intake air amount to the engine speed, a second sensor means for detecting engine speed, and means for issuing signals directed to the actuating means for engaging the clutch means when the ratio is larger than a predetermined value or when the engine speed is higher than a predetermined value.

4. An internal combustion engine according to claim 2, wherein said actuator means comprises an electromagnetic type actuator.

5. An internal combustion engine according to claim 1, wherein said engine is provided with a starter for starting the engine and wherein said detecting means comprises switch means for detecting a condition where the starter is operated, and means for issuing signals directed to the cancelling means for disengaging the clutch means when the starter is operated.

6. An internal combustion engine according to claim 5, wherein said engine is provided with an alternate and said detecting means further comprises means for detecting a voltage of the alternator signal, and said issuing means issues said signals when the voltage is larger than a predetermined level.

7. An internal combustion engine according to claim 1, wherein said engine is connected to a manually operated transmission mechanism provided with a shift lever and wherein said detecting means comprises switch means for detecting a neutral position of the shift lever, means for detecting the engine speed, and means for issuing signals directed to the cancelling means for disengaging the clutch means when the shift lever is in the neutral position and when the engine speed is lower than a predetermined value.

8. An internal combustion engine according to claim 1, wherein the engine is provided with an automatic transmission provided with a shift lever and wherein said detecting means comprises switch means for detecting a parking position of the shift lever, means for detecting the engine speed, and means for issuing signals directed to the cancelling means for disengaging the clutch means when the shift lever is in its parking position and when the engine speed is lower than a predetermined value.

9. An internal combustion engine according to claim 1, wherein said supercharger comprises a Roots-type blower having a plurality of rotors rotating with a small gap therebetween.

* * * * *